United States Patent [19]

Suzuki et al.

[11] Patent Number: 4,934,909
[45] Date of Patent: Jun. 19, 1990

[54] SCROLL COMPRESSOR WITH ROTATION PREVENTING APPARATUS

[75] Inventors: Shinichi Suzuki; Tetsuhiko Fukanuma; Takashi Ban, all of Kariya, Japan

[73] Assignee: Kabushiki Kaisha Toyoda Jidoshokki Seisakusho, Aichi, Japan

[21] Appl. No.: 281,246

[22] Filed: Dec. 7, 1988

[30] Foreign Application Priority Data

Dec. 21, 1987 [JP] Japan .................. 62-325097

[51] Int. Cl.⁵ ............ F04C 18/04; F04C 29/02; F16C 19/16; F16D 3/04
[52] U.S. Cl. ................... 418/55; 464/15; 464/103
[58] Field of Search .......... 418/55 B, 55 E; 464/102, 103, 15

[56] References Cited

U.S. PATENT DOCUMENTS 4,160,629  7/1979  Hidden et al. .............. 418/55

FOREIGN PATENT DOCUMENTS

| 59-28082 | 2/1984 | Japan . | |
|---|---|---|---|
| 59-49301 | 3/1984 | Japan | 418/55 E |
| 60-17955 | 5/1985 | Japan . | |
| 881409 | 11/1981 | U.S.S.R. | 464/103 |
| 392480 | 5/1933 | United Kingdom | 464/15 |

Primary Examiner—John J. Vrablik
Attorney, Agent, or Firm—Burgess, Ryan and Wayne

[57] ABSTRACT

A scroll compressor having a stationary scroll member and a rotary scroll member. The compressor is provided with a mechanism for obtaining an orbital movement of the rotary scroll member while preventing a rotation thereof about its own axis. The mechanism has a stationary and a rotary ring arranged in parallel and spaced from each other. These rings form a plurality of circumferential spaced facing pairs of circular holes. The mechanism also has shoes arranged in the respective holes and balls arranged between the shoes in the facing pair of holes. The shoes can maintain a parallel location with respect to the corresponding holes, since the shoes are movable relative to the ball. A sealtight contact of the rotary scroll member with the stationary scroll member is realized over a prolonged period.

6 Claims, 5 Drawing Sheets

SCROLL COMPRESSOR WITH ROTATION PREVENTING APPARATUS

BACKGROUND OF THE INVENTION

1. Field of the Invention

The present invention relates to a scroll compressor, and more particularly, to a mechanism for obtaining an orbital movement of a scroll member while preventing a rotation thereof about its own axis.

2. Description of the Related Art

Japanese Unexamined Patent Publication (Kokai) No. 59-28082 proposes a mechanism for obtaining an orbital movement in a scroll compressor, which includes a housing having a rotary scroll member housed therein A stationary ring and a rotary ring facing each other are arranged between the housing and the rotary scroll member at the facing sides thereof, respectively. Both rings form a plurality of opposite pairs of pockets and a tubular shaped bearing member arranged between the facing pockets. The arrangement is such that the radius of the orbital movement of the rotary scroll member is limited to the sum of the diameter of the movable area of the cylindrical bearing member in one of the opposite pockets and the diameter of the movable area of the cylindrical bearing member in the other pocket This orbital movement mechanism receives not only the thrust force in the rotary scroll member but also the radial force of the rotary scroll member, to prevent a rotation of the rotary scroll member about its own axis Accordingly, a compressor provided with this type of orbital movement mechanism has a simplified construction and requires a smaller number of parts when compared with a conventional type compressor provided with separate mechanisms for receiving the thrust force and for preventing self rotation.

In this type of improved mechanism for obtaining an orbital movement, an inclination of the cylindrical bearing member may occur due to displacement forces applied in opposite radial directions to the ends of the cylindrical bearing member during the orbital movement of the rotary scroll member, where a necessary precise degree of parallelism is not obtained between the end surfaces of the cylindrical bearing member. In this situation, the particular limited portions of the cylindrical bearing member, i.e., the edged portions at the ends of the member, can come into sliding contact with the corresponding housing and the rotary scroll member, which causes a partial wear of these parts after use for a very short period. Furthermore, even if the necessary precise degree of parallelism is obtained between the end surfaces of the cylindrical bearing member, wear and tear easily occurs during a very short period, based on the construction that the cylindrical bearing member is in partial contact, at the circumferential edge portions of the ends thereof, with the corresponding portions of the housing and the rotary scroll member. Due to this wear and tear, a clearance is generated between the inner surface of the base wall of the stationary scroll member and the tip end of the scroll portion of the stationary scroll member, thereby reducing the compression efficiency. Furthermore, the cylindrical bearing member is subjected to a reaction force caused by the compression at the portion near the outer periphery of the rotary scroll member, causing the base wall portion of the rotary scroll member to be bent. This brings the cylindrical bearing member into a greater partial contact with the rotary scroll member at the peripheral edge portions of the cylindrical bearing member, and thus wear and tear is very easily generated.

SUMMARY OF THE INVENTION

An object of the present invention is to provide a scroll compressor in which little wear of the parts occurs.

According to the present invention a scroll compressor is provided which comprises:

a housing assembly defining an inlet port for the medium to be compressed and an outlet for the removal thereof;

an axially extending drive shaft rotatably supported in the housing assembly;

a stationary scroll member fixedly arranged in the housing assembly and concentric to the shaft;

a movable scroll member freely rotatable about an axis which is spaced from the axis of the drive shaft;

the movable scroll member being arranged so as to realize an orbital movement without a rotation thereof about its own axis;

a plurality of chambers formed between the scroll members during the orbital movement of the rotary scroll member, the volume of the chambers being varied in accordance with the rotation of the rotary scroll member, the inlet port communicating the chambers for introduction of the medium thereto, and the outlet port communicating the chambers for removal of the medium therefrom;

a base plate fixedly connected to the housing and arranged on one side of the rotary scroll member;

a first means for defining a plurality of angularly spaced and outwardly opening first pockets which are integral with the base plate, each of the pockets defining a circular peripheral surface extending parallel to the axis of the shaft and a plane surface extending transverse to the axis of the shaft;

a second means for defining a plurality of angularly spaced and outwardly opening second pockets which are integral with the rotary scroll member, each of the second pockets defining a circular inner surface extending parallel to the axis of the shaft for support, and a plane surface extending transverse to the axis of the shaft, the first and second means being arranged so as to form a plurality of pairs of the first and the second pockets located adjacent to each other, and;

a plurality of connecting means, arranged in each of the pairs of first and second pockets, for allowing the rotary scroll member to realize an orbital movement while preventing it from rotating about its own axis;

each of said connecting means comprising first and second shoes arranged in the adjacent pair of first and second pockets, respectively, and a ball arranged between the first and second shoes;

the first and second shoes having outer peripheral surfaces in contact with the inner peripheral surfaces of the first and second pockets, respectively, for receiving a radial force generated during the orbital movement;

the first and second shoes having, on first axial ends thereof, a first generally planed surface in contact with the plane surfaces of the first and second pockets, respectively, and on the second axial ends, having second concave surfaces with which said ball is in contact with for receiving a thrust force When an orbital movement of the rotary scroll member is carried out to obtain a compression operation, a resultant generated force is received by the base plate of the housing via the rotary scroll member, the shoes on the rotary ring, the balls, and the shoes on the stationary ring. The shoes between which the balls are held rotate in the respective first and second holes constructing the pockets, in accordance with the orbital movement of the rotary scroll member, while the shoes are in contact with the opposite plane surface of the first and second pockets, respectively, and while the shoes maintain the contact with the circumferential surfaces of the first and second holes of the pockets, respectively, and thus the rotary scroll is prevented from rotating about its own axis. During the orbital movement of the rotary scroll member which is not rotated about its own axis, the one pair of shoes in contact with the circular wall in the pair of the holes of the pockets are, at positions diametrically opposite to each other, subjected to radial forces directed in the opposite direction. The shoes are not inclined in the respective pockets because of the separate construction of the shoes and ball. Even if the base plate of the rotary scroll member is bent, the shoes in the rotary scroll member are inclined with respect to the axis of the balls, so that the shoes on the side of the rotary scroll member cannot be inclined with respect to the holes therein. Accordingly, a smooth sliding movement of the shoe in the respective holes is obtained, and thus a smooth orbital movement of the rotary scroll member is obtained. Furthermore, a large pressure receiving area is generated between the shoes and rotary scroll member and the fixed base plate, thereby causing a pair of shoes and a ball to receive a large thrust force, which allows a reduction of the number of units needed to obtain an orbital movement Furthermore, the work for the pockets, which requires a high precision, can be alleviated

DESCRIPTION OF A PREFERRED EMBODIMENT

Figure 3:
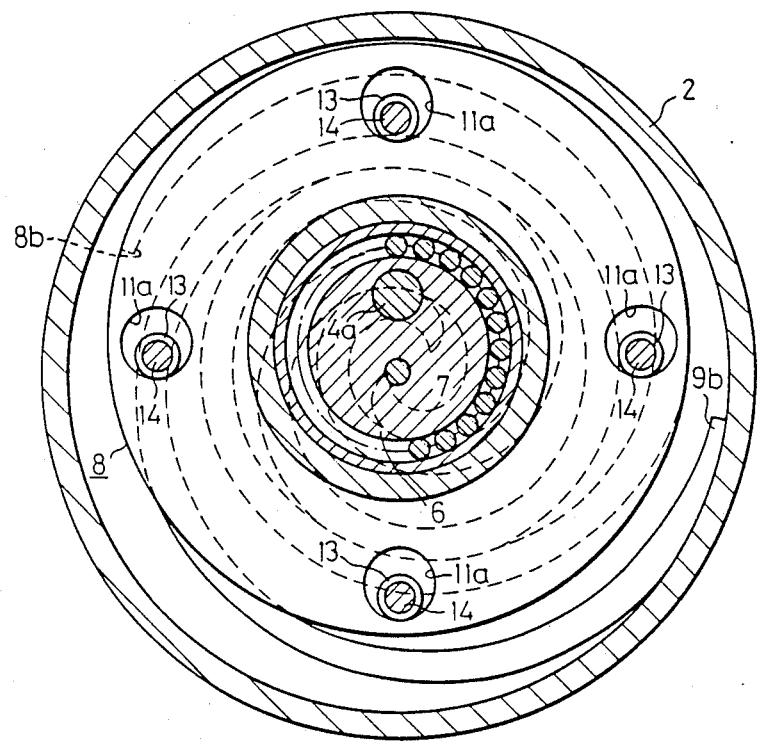
FIG. 3 is a cross-sectional view taken along the line III—III in FIG. 1.
Figure 5:
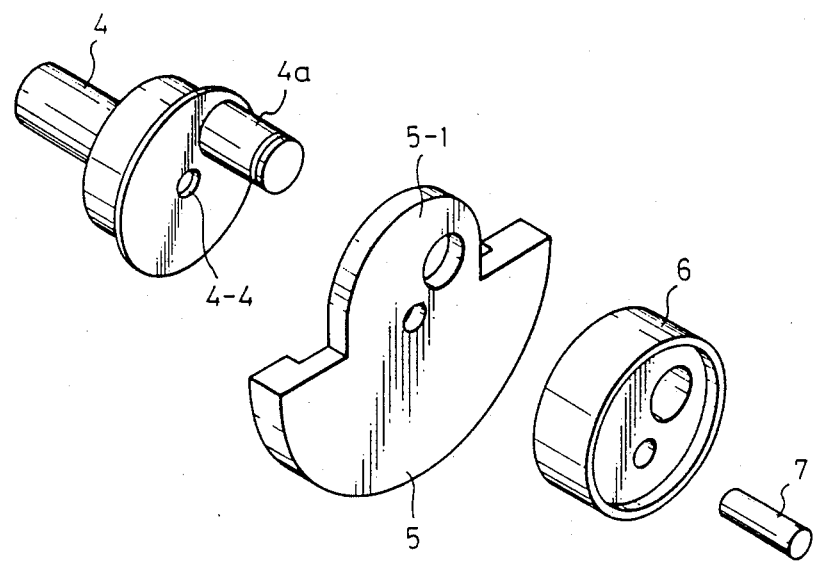

In an embodiment of the present invention, reference numeral 1 denotes a front housing and 2 a rear housing and these housings 1 and 2 are joined together via an annular base plate 3 by a not shown fixing means such as bolts and nuts. The front housing 1 is provided with a boss portion 1—1 in which a rotating shaft 4 is inserted The rotating shaft 4 has a first or outer end 4-1 having a small outer diameter and a second or inner end 4-2 having a large diameter, and these ends 4-1, 4-2 are supported by the boss portion 1—1 by a pair of axially spaced roller bearing units 30 and 32, respectively. A seal assembly 34 is arranged adjacent to the bearing unit 30 to establish an oil tight seal between the housings 1 and 2 and the shaft 4. An eccentric shaft 4a is rigidly connected to the shaft inner end portion 4-2 at the end surface thereof facing the rear housing 2 so that the eccentric shaft 4a extends, in a cantilever fashion, toward the rear housing. Reference numeral 5 (FIG. 5) denotes a balance weight of sector shape integrally extended from a plate member 5-1 and inserted into the pin 4a at a position substantially diametrically spaced from the balance weight 5. An eccentric bush member 6 is also inserted onto the shaft 4a and a pin 7 having a central axis which conforms to that of the rotating shaft 4 is inserted through both the bush member 6 and the balance plate 5-1. The central pin 7 is extended out of the balance plate 5-1 in such a manner that the pin 7, at an end 7-1 thereof, is projected into a recess 4—4 formed on the end surface of the large end portion 4-2 of the rotating shaft 4, permitting the balance weight 5 and bush member 6 to limit an amount of relative rotation Reference numeral 8 denotes a rotary scroll member having a disc-shaped base portion 8a and a boss portion 8-1 projecting from the base portion 8a toward the front housing 1, the bush member 6 being rotatably inserted in the boss portion 8-1 via a needle bearing assembly 8-2. Further, the rotary scroll member 8 is provided with a scroll portion 8b (FIG. 3) on the other side of the base portion remote from the boss portion 8-1. Reference numeral 9 denotes a stationary scroll member having a base portion 9a fixedly connected to the rear housing 2 by an O-ring 9-1 and a scroll portion 9b on a side of the base portion 9a facing the rotary scroll member 8. As will be understood, the scroll portions 8b and 9b are arranged to maintain contact with each other while the rotary member 8 realizes an orbital movement about the axis of the shaft 4, and as a result, compression chambers S each having a volume which first increases and then decreases during the rotation of the shaft 4, are formed between the base portions 8a and 9a and the scroll portions 8b and 9b to carry out an intake and exhaust of the fluid into and from the compression chambers S, respectively.

An intake chamber 1b for a gas as a cooling medium is formed between the front housing and the plate 3, and an inlet port 1a is formed in the front housing 1 for an introduction of the cooling medium into the chamber 1b. The chamber 1b is opened to the compression chambers S when the volume of the chambers is increasing for an introduction of the cooling medium A delivery chamber 2a for removal of the compressed medium is formed between the rear housing 2 and the stationary scroll member 9 The delivery chamber 2a is connected to the compression chamber S when the volume thereof is decreasing, so that the compressed air is introduced into the chamber 2a via a delivery valve 15, which is a check valve located in a passageway 9c connecting the compression chamber and the chamber 2a. The delivery valve 15 is constructed as a reed valve which is provided with a reed member 15a and a stopper member 15b.

Figure 1:
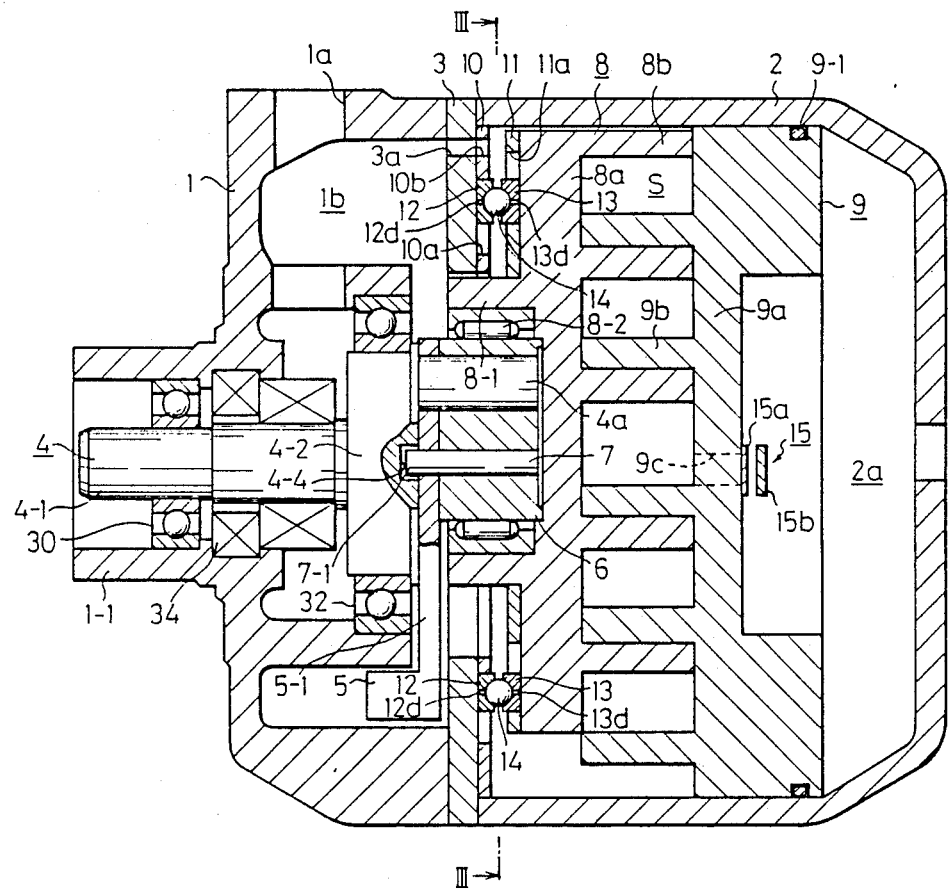
FIG. 1 is an axial cross-sectional view of the compressor according to the present invention.
Figure 2:
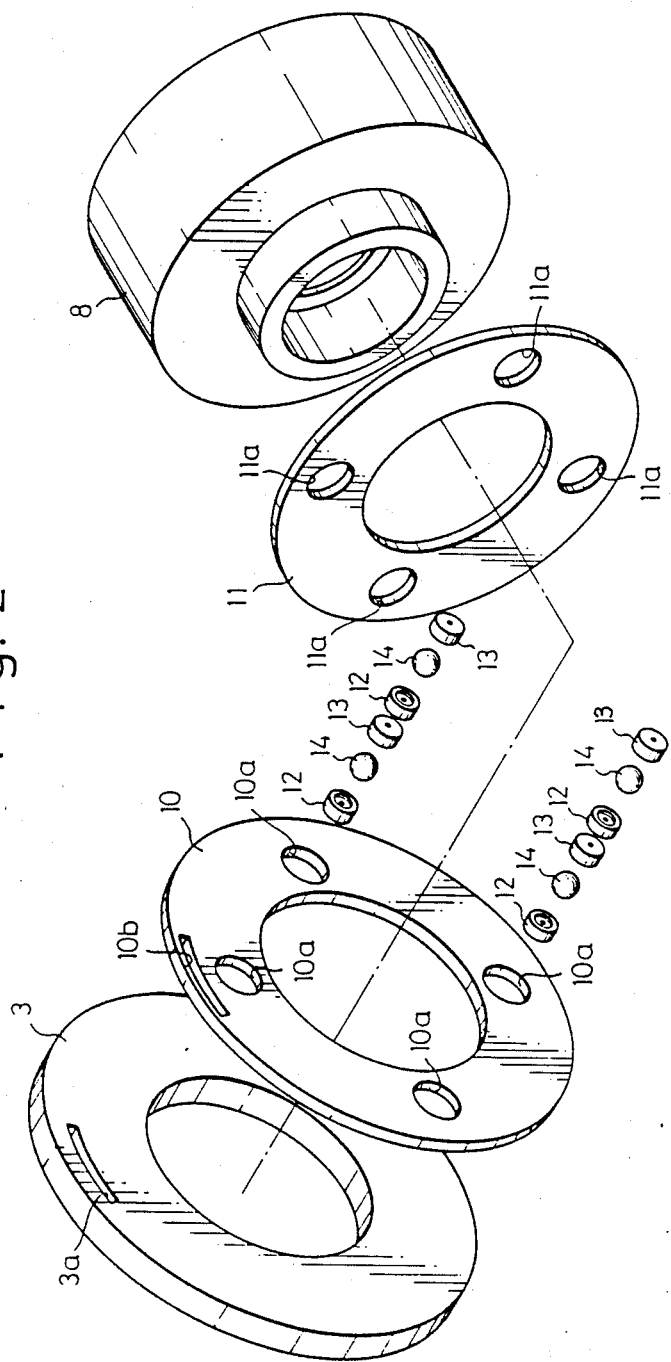
FIG. 2 is an exploded perspective view of essential parts of the present invention.

Further, the compressor has a plurality of pairs of facing pockets and a connecting member arranged between the facing pockets. Each of the pockets has, as will be understood, circular holes defining an inner wall extending in parallel to the axis of the shaft 4 and a plane surface extending transversely to the axis of the shaft. Each of the connecting members is formed by shoes arranged in the respective holes and a ball arranged between the shoes. The construction will now be more fully described A stationary ring 10 is fixedly connected to a side of the base plate 3 facing the rotary scroll member 8. The stationary ring 10 forms a plurality of equiangularily spaced holes 10a (FIG. 2) having a circular shape for delimiting the position of the orbital movement. A rotary ring 11 is fixedly connected to the base portion 8a of the rotary scroll member 8, at the end surface thereof remote from the scroll portion 8b, so that the stationary ring 10 and rotary ring 11 face each other. The rotary ring 11 forms a plurality of equiangularily spaced holes 11a (FIG. 2) having a circular shape for delimiting the position of the orbital movement, and the holes 11a face the corresponding holes 10a in the stationary ring 10. Each of the holes 10a and 11a has an inner circular surface (or periphery) extending in parallel to the axis of the shaft 4 and each of the ring 3 and the base portion 8a of the rotary scroll member 8 forms a plane surface 3-1 or 8a-1 (FIG. 4) extending transversely to the axis of the shaft 4. The hole 10a or 11a defining an inner circular peripheral wall together with the plane surface 3-1 or 8a-1 forms a pocket for storing the connecting member. Namely, a plurality (four) of pairs of facing pockets are formed by the holes 10a and 11a. A shoe 12 having a substantially circular cross-sectional shape is located in each of the holes 10a in the stationary ring 10; the shoe 12 having an outer diameter smaller than the inner diameter of the hole 10a. A shoe 13 having a substantially circular cross-sectional shape is located in each of the holes 11a in the rotary ring 11; the shoe 13 having an outer diameter smaller than the inner diameter of the hole 11a. A ball 14 is arranged between each of the facing pairs of shoes 12 and 13, and thus the facing pair of shoes 12 and 13 and the ball 14 arranged therebetween form a connecting member arranged between a pair of facing pockets.

Figure 4:
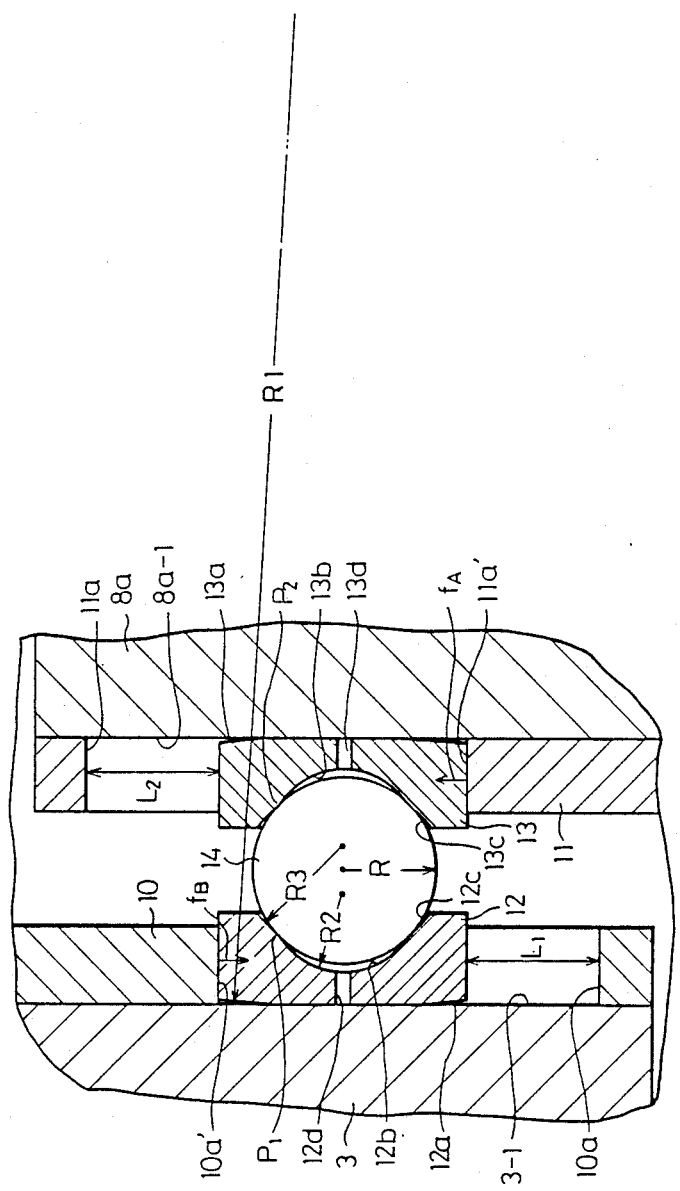
FIG. 4 is an enlarged sectional view of a unit for obtaining an orbital movement; and, FIG. 5 is an exploded perspective view showing a balance mechanism in FIG. 1.

As shown in FIG. 4, the shoe 12 in the stationary ring 10 is formed with spherical abutting end surfaces 12a which are in contact with the end surface 3-1 of the base plate 3 and are slightly rounded with respect to a plane of the end surface 3-1, i.e., the end surface 12a has a radius R1 which is very much larger than the radius R of the ball 14. Similarly, the shoe 13 in the rotary ring 11 is formed with spherical end surfaces 13a which are in contact with the end surface 8a-1 of the base portion 8a of the rotary scroll member 8 and are slightly rounded with respect to a plane of the end surface, i.e., the end surface 13a has a radius which is very much larger than the radius R of the ball 14. At the side remote from the rounded projected surface 12a, the shoe 12 has a concave surface having a first and central portion 12b having a radius R2 which is smaller than R and a second portion 12c connected at the periphery thereof to the first portion 12b and having a radius R3 which is larger than R. Namely, a circular projection $p_1$ is formed at a region where the central portion 12b is connected to the outer portion 12c Similarly, at the side remote from the rounded projected surface 13a, the shoe 13 has a concave surface having a first and central portion 13b having a radius which is smaller than R and a second portion 13c connected at the periphery thereof to the first portion and having a radius which is larger than R. Namely, a circular projection $p_2$ is formed at a region where the central portion 13b is connected to the outer portion 13c. As a result of this arrangement, the ball 14 arranged between the pair of faced shoes 12 and 13 is in contact with the concave surface at the circular projections $p_1$ and $p_2$, respectively, which permits the rotary scroll member 8 to realize an orbital movement about the axis of the shaft 4, and the tip ends of the scroll portion 8b and 9b of the scroll members 8 and 9 are in contact with the facing surfaces of the base wall portions 9a and 8a of the scroll members 9 and 8.

It should be noted that the radius of the orbital movement of the rotary scroll member 8 is equal to a sum of the lengths $L_1$ and $L_2$ of the movable area of the shoes 12 and 13 in the holes 10a and 11a of the rings 10 and 11, respectively The rotation of the shaft 4 causes an orbital movement of the eccentric shaft 4a about the axis of the shaft 4, by which the shoes 12 and 13 are rotated in the holes 10a and 11a, respectively, and the facing pair of shoes 12 and 13 are in contact with the facing pair of the holes 10a and 11a at their circular peripheries and, respectively, at positions 10a' and 11a' diametrically opposite to each other, so that rotation of the rotary scroll member 8 around its own axis is prevented.

The fixed annular base plate 3 and stationary ring 10 are provided with arc-shaped induction passageways 3a and 10b, respectively, aligned with each other for introducing the coolant gas medium from the induction chamber 1b, after being introduced via the inlet port 1a, into the compression chamber via the passageways 3a and 10b and a space between the faced rings 10 and 11. The gas, after compression, is introduced into the outlet chamber 2a in the rear housing 2 via the delivery valve 15 located in the delivery passageway.

As shown in FIG. 4, the shoe 12 has an opening 12d therethrough between the outer convex surface 12a and inner concave surface 12b, and similarly, the shoe 13 has an opening 13d therethrough between the outer convex surface 13a and inner concave surface 13b. As a result, lubrication oil mist in the cooling gas medium is introduced into the bores 12d and 13d via clearances between the plate 3 and convex surface 12a and between the base portion 8a and convex surface 13a, respectively, and thus a lubrication of the contacting zones of the fixed plate 3 and the shoe 12, rotary ring 11 and shoe 13, and ball 14 and shoes 12 and 13 is obtained A counter compression force and centrifugal force generated in the rotary scroll member 8 during rotation thereof are received by the stationary base plate 3 and stationary ring member 10 via the shoes 13, balls 14, and shoes 12, causing a force in the radial direction to be generated in the shoes 13, as shown by an arrow $f_A$ in FIG. 4, by way of the rotary ring 11, and a counter force in the radial direction to be generated in the shoes 12, as shown by an arrow $f_B$, via the stationary ring 10. Namely, the shoes 12 and 13 are subjected, respectively, to radial forces in opposite directions, but this does not cause any inclination of the shoes 12 and 13 with respect to the opposing sliding surfaces 3-1 and 8a-1, due to the construction of the shoes 12 and 13 and balls 14, which are movable independently of each other Therefore, partial and premature wear at particular regions, such as the angular regions where the shoes 12 and 13 are in contact with the members 3 and 8, respectively, of the stationary ring member 3 and the rotary scroll member 8 is prevented, during the orbital movement. This advantage can be obtained even when the base wall 8a of the rotary scroll member 8 is bent Namely, when the base wall 8a is bent, the general plane of the holes 11a can be slightly inclined with respect to the vertical axis, and the shoes 13 can slide on the ball 14 about the axis thereof, thereby preventing an inclination of the shoes with respect to the holes 11a. As a result, as long as the distances between the bottom of the shoes 12 to the center of the ball 14 and between the bottom of the shoe 13 to the center of the ball 14 are precisely maintained, a predetermined location of the orbital movement of the rotary scroll member 8 in the direction caused when the thrust force is applied thereto is maintained for a prolonged period without change, thereby obtaining a high compression efficiency It should be noted that the maintenance of such precise distances as a means for maintaining the predetermined location of the orbital movement is very easy to obtain when compared with a conventional means for maintaining the predetermined location of the orbital movement by a precise parallel relationship of the cylindrical bearing members.

When an excessive force in the radial direction is applied to the shoes 12 and 13, a thrust force as a counterforce to the above mentioned radial force is generated at the region $p_1$ between the concave surfaces 12b and 12c and the region $p_2$ between the concave surfaces 13b and 13c, to maintain the desired orbital movement of the scroll member 8. The shoes 12 and 13 have spherical surfaces 12a and 13a which are very near to a plane, permitting the contacting areas and contacting surface pressure with respect to the balls 14 to be reduced, compared with those in the prior art where a direct contact of the ball is employed, resulting in a reduced number of the units each composed of the shoes 12 and 13 and the ball 14. In relation to this effect of reducing the number of units, the amount of work for forming the holes 10a and 11a, which requires a high precision, can be reduced, thereby greatly increasing the cost efficiency because the number of parts can be reduced and because the necessary work can be reduced The above mentioned effect of reducing the contacting surface pressure also permits the necessary number of orbital movement units having a reduced resistance ability to wear, by forming the stationary base plate 3 and rotary scroll member 8 from aluminum material, resulting in a reduced weight of the entire compressor.

The present invention is, of course, not limited to the embodiment as described. For example, the surfaces of the shoes 12 and 13 in contact with the respective balls 14 may have a radius which is larger than the radius R of the ball 14, which also permits the lubrication oil included in the cooling gas medium to be introduced into an area close to the center of the area for receiving the ball, so that an effective lubrication of the contacting area between the ball 14 and the shoes 12 and 13 is obtained. Furthermore, the bottom surfaces of the shoes 12 and 13 may be a plane, which allows a large area bottom area of the orbital movement delimiting holes 10a and 11a, so that a sufficient lubrication is realized at the regions between the shoes 12 and stationary plate 3 and between the shoes 13 and the rotary scroll member 8.

We claim:

1. A scroll compressor comprising:
    a housing assembly defining an inlet port for a medium to be compressed and an outlet for removal of said medium;
    an axially extending drive shaft rotatably supported in the housing assembly;
    a stationary scroll member arranged fixedly in the housing assembly and concentrically to the shaft;
    a movable scroll member arranged to be freely rotatable about an axis spaced from the axis of the drive shaft;
    the movable scroll member arranged so as to realize an orbital movement with rotation about its own axis;
    a plurality of chambers formed between the scroll members during the orbital movement of the movable scroll member, the volume of which is varied in accordance with the orbital movement of the movable scroll member, the inlet port communicating with the chambers for introduction of the medium thereto and the outlet port communicating with the chambers for removal of the medium therefrom;
    a base plate fixedly connected to the housing and arranged on one side of the movable scroll member;
    first means for defining a plurality of angularly spaced and outwardly opening first pockets which are integral with the base plate, each of the pockets defining a circular peripheral surface extending parallel to the axis of the shaft and a plate surface extending transverse to the axis of the shaft;
    second means for defining a plurality of angularly spaced and outwardly opening second pockets which are integral with the movable scroll member, each of the second pockets defining a circular inner surface extending in parallel to the axis of the shaft for support and a plane surface extending transverse to the axis of the shaft, the first and second means being arranged so as to form a plurality of pairs of the first and the second pockets located adjacent to each other;
    a plurality of connecting means, arranged in each pair of the first and second pockets, for allowing the movable scroll member to realize an orbital movement while being prevented from rotating about its own axis;
    each of said connecting means comprising a first and a second shoe arranged in the adjacent pair of the first and second pockets, respectively, and a ball arranged between the
    the first and second shoes having outer peripheral surfaces in contact with the inner peripheral surfaces of the first and second pockets, respectively, for receiving a radial force generated during the orbital movement; and
    the first and second shoes having, on a first axial end thereof, a first generally plane surface in contact with the plane surfaces of the first and second pockets, respectively, and having, on a second axial end thereof, a second recessed surface with which said ball is in contact for receiving a thrust force.

2. A compressor according to claim 1, wherein the first plane surface of the first or second shoe forms a spherically projected surface which is substantially a plane.

3. A compressor according to claim 1, wherein the second recessed surface of the first or second shoe forms a first spherical portion located at the center thereof, having a diameter smaller than that of the ball and a second spherical portion located around the first portion having a diameter larger than that of the ball, so that a circumferential projecting area for contact with the ball is formed between the first and second portions.

4. A compressor according to claim 3, wherein at least the first or second shoe has an opening therethrough having one end open to the first generally plane surface, and the other end open to the second recessed surface.

5. A compressor according to claim 1, wherein said first means for defining the first pockets comprises a stationary ring which is separate from and fixedly connected to the base plate, the stationary ring defining angularly spaced holes therethrough which form the inner circular peripheral surface of the first pocket, the base plate forming the plane surface of the first pocket.

6. A compressor according to claim 1, wherein said second means for defining the second pockets comprises a movable ring which is separate from and fixedly connected to the movable scroll member, the rotary ring defining angularly spaced holes therethrough which form the inner circular peripheral surface of the second pocket, the scroll member forming the plane surface of the second pocket.

* * * * *